United States Patent [19]

Zajac

[11] Patent Number: 5,094,426
[45] Date of Patent: Mar. 10, 1992

[54] METERING VALVE ASSEMBLY

[76] Inventor: John Zajac, 1137 Angmar Ct., San Jose, Calif. 95121

[21] Appl. No.: 516,084

[22] Filed: Apr. 27, 1990

[51] Int. Cl.⁵ ............... F16K 31/122; F16K 1/52
[52] U.S. Cl. ........................... 251/14; 251/60; 251/129.11; 251/129.05
[58] Field of Search ............ 251/14, 60, 129.08, 251/129.11, 129.05

[56] References Cited

U.S. PATENT DOCUMENTS

| | | | |
|---|---|---|---|
| 2,663,318 | 12/1953 | Lakso | 251/14 |
| 3,512,550 | 5/1970 | Ammann | 251/60 X |
| 4,180,239 | 12/1979 | Valukis | 251/60 |
| 4,421,292 | 12/1983 | Matsui et al. | 251/63.6 X |
| 4,976,404 | 12/1990 | Ichikawa et al. | 251/129.08 X |

Primary Examiner—Arnold Rosenthal
Attorney, Agent, or Firm—Flehr, Hohbach, Test, Albritton & Herbert

[57] ABSTRACT

Metering valve assembly having a poppet movable relative to a valve seat for controlling communication through an orifice. The poppet is urged toward the valve seat with a closing force, and the poppet can be adjusted gradually to provide a fine adjustment of the communication through the orifice. An actuator is operably connected to the poppet to overcome the closing force and move the poppet rapidly to a preset position. When the actuator is not actuated the closing force urges the poppet toward the valve seat to provide a positive shut-off.

10 Claims, 2 Drawing Sheets

METERING VALVE ASSEMBLY

This invention pertains generally to valves and, more particularly, to a metering valve assembly which provides both gradual adjustment and quick action of the valve mechanism.

Metering valves are utilized in a wide variety of applications to provide a fine adjustment of fluid flow or the application of a vacuum. Such valves are commonly of the so-called "butterfly" type with a throttle plate which is rotated within a passageway to vary the size of the opening through the passageway. Such valves are delicate and relatively expensive, and they generally do not have any provision for quick action or positive shut-off.

In order to provide positive shut-off with a butterfly valve, it is generally necessary to use a separate shut-off valve which is designed specifically for this purpose. This approach requires an additional valve which typically doubles the cost of the installation and requires additional space for the second valve.

It is in general an object of the invention to provide a new and improved metering valve assembly.

Another object of the invention is to provide a metering valve assembly of the above character which overcomes the limitations and disadvantages of the metering valves heretofore provided.

Another object of the invention is to provide a metering valve assembly of the above character which provides quick action and positive shut-off in addition to a finely controlled metering function.

These and other objects are achieved in accordance with the invention by providing a metering valve having a valve seat surrounding an orifice, a poppet movable in an axial direction relative to the valve seat for controlling communication through the orifice, means yieldably urging the poppet and the valve seat together with a predetermined force, releasable means for holding the poppet and the valve seat in an open position, and means for gradually adjusting the distance between the poppet and the valve seat to provide a fine adjustment of the communication through the orifice when the valve is in the open position. The poppet and the valve seat can be moved rapidly to a preset position to provide a preset communication through the orifice.

Figure 1:
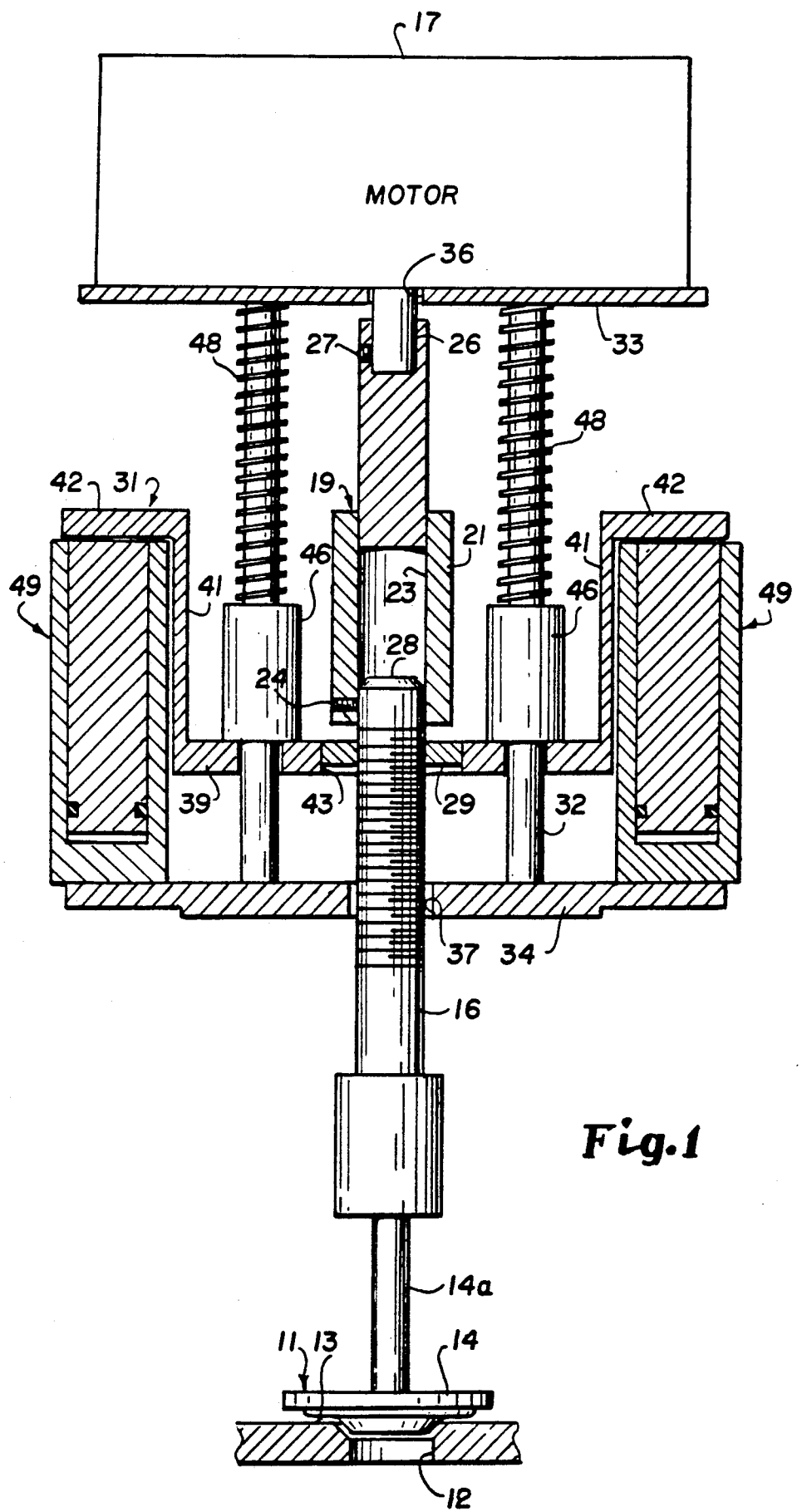
FIG. 1 is cross-sectional view of one embodiment of a metering valve assembly according to the invention.

As illustrated in FIG. 1, the valve assembly includes a valve 11 which has an orifice 12 surrounded by a seat 13, and a poppet 14 which is movable in an axial direction between open and closed positions relative to the seat for controlling communication through the orifice. The poppet and valve seat can be of any desired size, and they permit the valve to have an orifice of substantially larger diameter than metering valves of the prior art. With the poppet, for example, the orifice can have a diameter on the order of 1-5 inches, or larger.

A lead screw 16 driven by a reversible stepping motor 17 is connected to the stem 14a of the poppet for adjusting the position of the poppet relative to the valve seat and provide accurate control or "fine tuning" of the communication through the orifice. The stepping motor is connected to the lead screw by an axially extensible and retractable coupling 19 having a first section 21 affixed to the lead screw and a second section 22 affixed to the output shaft of the stepping motor. Coupling section 21 has an axially extending bore 23 with a diameter corresponding to the diameter of the lead screw, and the upper end of the lead screw extends into the bore and is secured there by a set screw 24. The output shaft of the stepping motor is received in a blind bore 26 in the upper end of coupling section 22 and secured there by a set screw 27. Section 21 is slidably received in bore 23, and the two coupling sections are keyed together for rotation as a unit while being free to move axially of each other. The upper end of lead screw 16 serves is provided with a chamfer, as indicated by reference numeral 28.

Lead screw 16 is threadedly mounted in a nut 29 on a carriage 31 which is mounted on guide rods 32 for movement in the axial direction relative to valve seat 13. The upper ends of the guide rods are affixed to a plate 33 on which the stepping motor is mounted, and the lower ends of the rods are affixed to a base plate 34. Rods 32 and plates 33, 34 are mounted in a fixed position relative to the valve seat, and the plates have central openings 36, 37 through which the motor shaft and the lead screw pass.

Carriage 31 includes a circular base 39, a cylindrical side wall which extends in an upward direction from the periphery of the base, and an annular flange 42 which extends in an outward direction from the top of the side wall. Nut 29 is mounted in a central opening 43 in base 39, and bearing bosses 46 extend in an upward direction from the base in sliding engagement with guide rods 32.

Coil springs 48 are mounted on guide rods 32 and engage the underside of motor mounting plate 33 and the upper ends of bearing bosses 46 to urge the carriage in a downward direction and the poppet toward its closed position with a predetermined force.

A pneumatic cylinder 49 of annular cross-section is mounted on base plate 34 in engagement with the under side of carriage flange 42. The cylinder is positioned coaxially of lead screw 16 and coupling 19 and outside the side wall 41 of carriage 31. When actuated, cylinder 49 applies an upward force to carriage 31 which is substantially greater than the downward force of springs 48. This causes the carriage to move rapidly in an upward direction until coil springs 48 are fully compressed. The movement of the carriage causes the poppet to move rapidly away from the valve seat to an open position.

Operation and use of the valve assembly of FIG. 1 are as follows. The valve 11 can be connected to any system in which communication or flow is to be controlled, e.g. a system for controlling the application of vacuum to a reactor chamber (not shown). Cylinder 49 is pressurized to compress springs 48, and stepping motor 17 is energized to turn the lead screw to adjust the spacing between the poppet and the valve seat and hence the amount of communication or flow through the valve orifice. The stepping motor and lead screw provide a gradual adjustment of the poppet which permits it to be set precisely for a desired communication or flow. When the pressure is released from cylinder 49, springs 48 move the poppet into sealing engagement with the valve seat, providing a positive shut-off for the valve.

When the pneumatic cylinder is once again actuated, the valve returns to its previous throttle position, i.e. the position prior to shut off. This is particularly useful in applications where it is desired to suddenly apply a preset pressure or a preset vacuum to a system.

Figure 2:
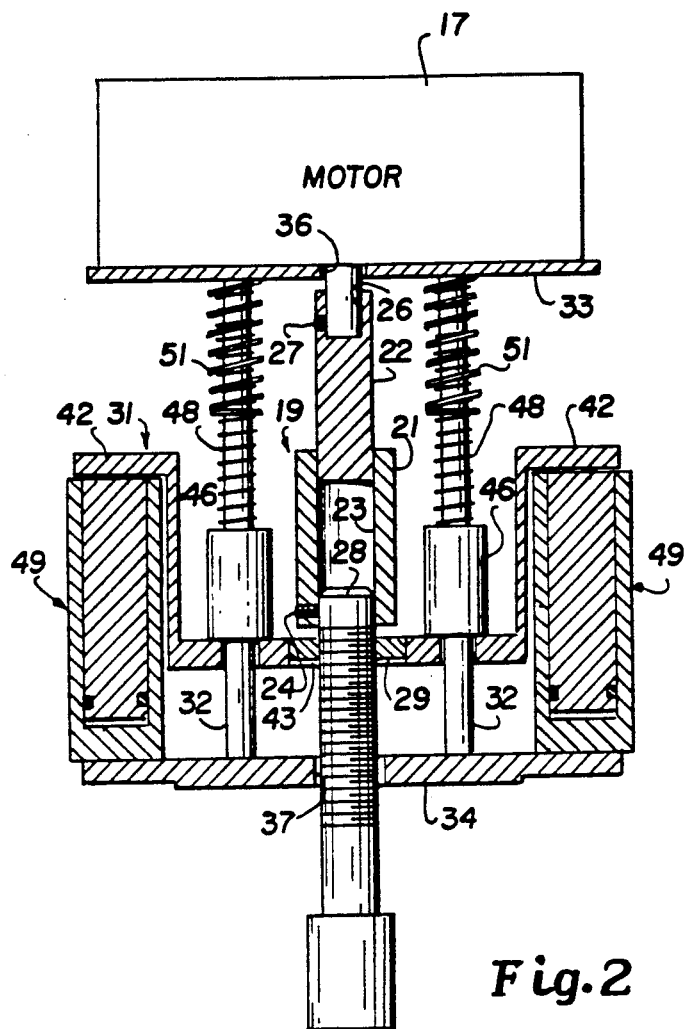
FIG. 2 is cross-sectional view of another embodiment of a metering valve assembly according to the invention.

The embodiment of FIG. 2 is generally similar to the embodiment of FIG. 1, and like reference numerals designate corresponding elements in the two embodiments. In the embodiment of FIG. 2, a second coil spring 51 is mounted on each of the guide rods 32, and the valve can be moved selectively to either of two open positions by cylinder 49. Coil springs 51 are shorter and of greater diameter than springs 48, and they are disposed coaxially about the upper portions of springs 48. Springs 51 have a greater spring constant than springs 48, and in one presently preferred embodiment the spring constant of springs 51 is on the order of four times the spring constant of springs 48.

In the embodiment of FIG. 2, a force from cylinder 49 greater than the force of springs 48 but less than the force required to compress both springs 48 and 51 moves the carriage in an upward direction until bearing bosses 46 abut against springs 51 to define the first or partly open position of the valve. When the cylinder is actuated to produce a force greater than the combined force of springs 48 and 51, both sets of springs are compressed, and the poppet moves to its second or fully open position. This arrangement is particularly useful in applications where it is desirable to move the valve rapidly to its fully open position, e.g. to provide a very fast pump down of pressure in a vacuum system.

Figure 3:
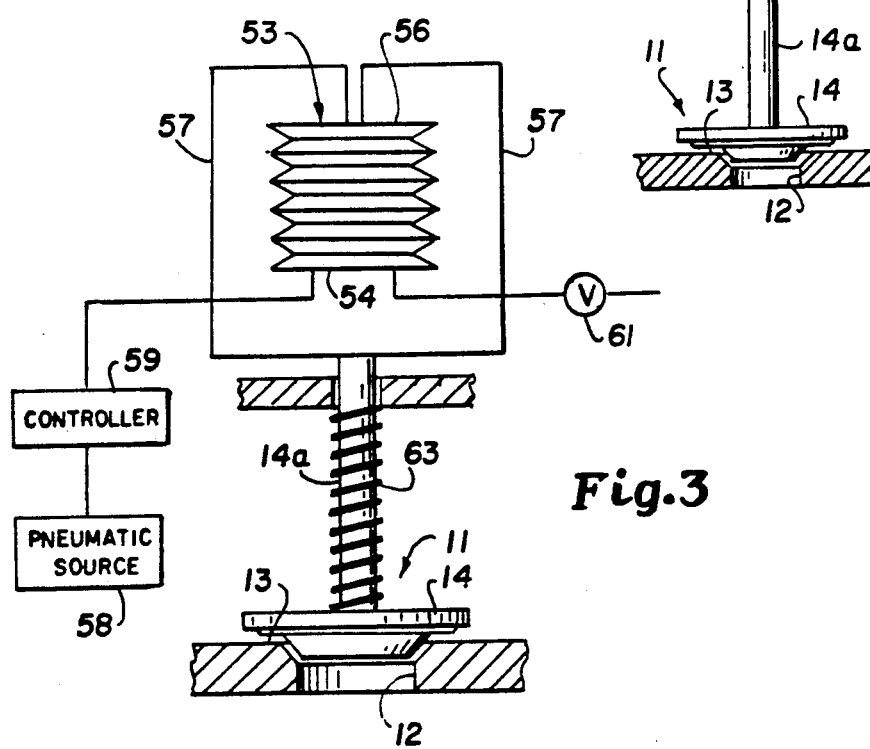
FIG. 3 is a schematic view of another embodiment of a metering valve assembly according to the invention.

In the embodiment of FIG. 3, the position of poppet 14 relative to valve seat 13 is adjusted by means of a pnuematic actuator 53 to control communication through orifice 12. In the embodiment illustrated, the actuator comprises a bellows which has a base 54 mounted in a fixed position and a movable output member 56 connected to poppet stem 14a by a frame 57 such that expansion of the bellows causes the poppet to move away from the valve seat. The bellows is particularly advantageous for use in this application because it is substantially frictionless. However, if desired, other suitable types of pneumatic actuators, such as a pancake cylinder, can be utilized in place of the bellows.

In order to accurately control the positioning of the poppet and hence the communication through the valve orifice, it is necessary to carefully control the pressure applied to the pneumatic actuator. As illustrated in FIG. 3, a source 58 of pressurized air or other suitable pneumatic medium is connected to a controller 59, which controls the pressure applied to the bellows. A bleed valve 61 is connected to the bellows for releasing pressure from the bellows. The controller can be of any suitable type, for example, a pressure controller, a mass flow controller, or even a fast acting valve.

A coil spring 63 is mounted on the stem of the poppet and urges the poppet toward the valve seat with a force which can be overcome by the pressure applied to the bellows but is strong enough to assure a positive closing of the valve.

In operation, the pressure within the bellows is adjusted by means of the controller and the bleed valve to adjust the position of the poppet relative to the valve seat and, hence, the degree of communication through the valve. The coil spring urges the poppet toward the valve seat, and as the pressure in the bellows is reduced, the poppet moves toward the seat under the force of the spring. In the event of a loss of pressure in the pneumatic system, the poppet will be moved immediately to the closed position by the spring. Thus, the pneumatic actuator and the spring provide a positive shut-off valve which can be set very precisely in normal operation and which will close quite rapidly in the event of a problem.

The invention has a number of important features and advantages. It provides a metering valve which can be set quite accurately and can also be moved to a preset position, a fully open position or a fully closed position quite rapidly. With the stepping motor and a lead screw having a pitch of 8 turns per inch, the position of the poppet can be controlled to within about 0.00004 inch. With a pneumatic bellows, the position of the poppet can be controlled to within about 0.001 inch. By way of comparison, a standard butterfly valve provides about a 15:1 change in pumping speed between fully opened and fully closed positions. The embodiment with the lead screw and stepping motor provides a change in pumping speed of about 40:1, and the embodiment with the pneumatic actuator provides a range of about 20:1.

It is apparent from the foregoing that a new and improved metering valve assembly has been provided. While only certain presently preferred embodiments have been described in detail, as will be apparent to those familiar with the art, certain changes and modifications can be made without departing from the scope of the invention as defined by the following claims.

I claim:

1. In a metering valve assembly: a valve comprising a valve seat surrounding an orifice, a poppet movable in an axial direction relative to the valve seat for controlling communication through the orifice, a first spring yieldably resisting movement of the poppet from the valve seat to a first open position with a first predetermined force, a second spring yieldably resisting movement of the poppet from the first open position to the second open position with a second predetermined force greater than the first predetermined force, means for gradually adjusting the distance between the poppet and the valve seat to provide a fine adjustment of the communication through the orifice, and means for selectively applying forces greater than the first and second predetermined forces to the valve to move the poppet to the first and second open positions.

2. In a metering valve assembly: a valve seat surrounding an orifice, a poppet movable in an axial direction relative to the valve seat for controlling communication through the orifice, a carriage movable in the axial direction, a lead screw threadedly mounted on the carriage and connected to the poppet for adjusting the position of the poppet relative to the valve seat, a stepping motor connected to the lead screw for rotating the lead screw to adjust the position of the poppet, means yieldably urging the carriage toward the valve seat with a predetermined force, and means for applying a force greater than the predetermined force to the carriage to move the poppet away from the valve seat to an open position.

3. The metering valve assembly of claim 2 wherein the means for applying a force to the carriage comprises a pneumatic cylinder.

4. In a metering valve assembly: a valve seat surrounding an orifice, a poppet movable in an axial direction relative to the valve seat for controlling communication through the orifice, a carriage movable in the axial direction, a lead screw threadedly mounted on the carriage and connected to the poppet for adjusting the position of the poppet relative to the valve seat, a first spring yieldably resisting movement of the carriage away from the valve seat to a first predetermined position with a first predetermined force, a second spring having a spring constant greater than the first spring yieldably resisting movement of the carriage from the first predetermined position to a second predetermined position with a second predetermined force, and means for selectively applying forces greater than the first and second predetermined forces to the carriage to move the carriage to the first and second predetermined positions and thereby move the poppet to first and second open positions.

5. In a metering valve assembly: a valve seat surrounding an orifice, a poppet movable in an axial direction relative to the valve seat for controlling communication through the orifice, a carriage movable in the axial direction, a lead screw threadedly mounted on the carriage and connected to the poppet for adjusting the position of the poppet relative to the valve seat, a stepping motor connected to the lead screw for rotating the lead screw to adjust the position of the poppet, means yieldably resisting movement of the poppet away from the valve seat to a first position with a first predetermined force and form the first open position to the second open position with a second predetermined force, and means for selectively applying forces greater than the first and second predetermined forces to the carriage to move the poppet to the first and second open positions.

6. In a metering valve assembly: a valve seat surrounding an orifice, a poppet movable in an axial direction relative to the valve seat for controlling communication through the orifice, a carriage movable in the axial direction, a lead screw threadedly mounted on the carriage and connected to the poppet for adjusting the position of the poppet relative to the valve seat, means yieldably resisting movement of the carriage away from the valve seat to a first open position with a first predetermined force and from the first open position to the second open position with a second predetermined force, and means including a pneumatic cylinder for selectively applying forces greater than the first and second predetermined forces to the carriage to move the poppet to the first and second open positions.

7. In a metering valve assembly: a valve seat surrounding an orifice, a poppet movable in an axial direction relative to the seat for controlling communication through the orifice, a base mounted in a fixed position relative to the valve seat, a plurality of guide rods affixed to the base and extending in a direction generally parallel to the axis, a carriage mounted on the guide rods for movement in the axial direction, a compression spring disposed coaxially about each of the guide rods and engaging the carriage to resist movement of the carriage away from the valve seat with a predetermined force, a lead screw threadedly mounted on the carriage and connected to the poppet for adjusting the position of the poppet relative to the valve seat, a drive motor affixed to the rods and operably connected to the lead screw for rotating the lead screw to adjust the position of the poppet, and a pneumatic cylinder of annular cross section mounted on the base and positioned coaxially of the lead screw for applying a force greater than the predetermined force to the carriage to move the poppet away from the valve seat to an open position.

8. The metering valve assembly of claim 7 wherein the drive motor comprises a stepping motor.

9. In a metering valve assembly: a valve seat surrounding an orifice, a poppet movable in an axial direction relative to the seat for controlling communication through the orifice, a base mounted in a fixed position relative to the valve seat, a plurality of guide rods affixed to the base and extending in a direction generally parallel to the axis, a carriage mounted on the guide rods for movement in the axial direction, a lead screw threadedly mounted on the carriage and connected to the poppet for adjusting the position of the poppet relative to the valve seat, a drive motor affixed to the rods and operably connected to the lead screw for rotating the lead screw to adjust the position of the poppet, a first compression spring disposed coaxially about each of the guide rods and engaging the carriage to resist movement of the poppet from a closed position to a first open position with a first predetermined force, a second compression spring of greater spring constant than the first spring disposed coaxially about the first spring on each of the guide rods for engagement with the carriage when the poppet reaches the first open position to resist movement of the poppet from the first open position to a second open position with a second predetermined force, and means including a pneumatic cylinder of annular cross section mounted on the base and positioned coaxially of the lead screw for selectively applying forces greater than the first and second predetermined forces to the carriage to move the poppet to the first and second open positions.

10. The metering valve assembly of claim 7 wherein the drive motor comprises a stepping motor.

* * * * *